US012768660B2

(12) United States Patent
Quinale

(10) Patent No.: US 12,768,660 B2
(45) Date of Patent: Oct. 20, 2026

(54) METHOD AND DEVICE FOR DETERMINING A ROUTE

(71) Applicant: Naxos Finance SA, Luxembourg (LU)

(72) Inventor: Laura Quinale, Turin (IT)

(73) Assignee: Naxos Finance SA, Luxembourg (LU)

( * ) Notice: Subject to any disclaimer, the term of this patent is extended or adjusted under 35 U.S.C. 154(b) by 175 days.

(21) Appl. No.: 18/029,922

(22) PCT Filed: Sep. 28, 2021

(86) PCT No.: PCT/IB2021/058837
§ 371 (c)(1),
(2) Date: Apr. 3, 2023

(87) PCT Pub. No.: WO2022/090830
PCT Pub. Date: May 5, 2022

(65) Prior Publication Data

US 2023/0366686 A1 Nov. 16, 2023

(30) Foreign Application Priority Data

Oct. 1, 2020 (IT) ........................ 102020000023227

(51) Int. Cl.
*G01C 21/34* (2006.01)
*B60W 60/00* (2020.01)
(Continued)

(52) U.S. Cl.
CPC ....... *G01C 21/3453* (2013.01); *B60W 60/001* (2020.02); *G01C 21/3407* (2013.01);
(Continued)

(58) Field of Classification Search
None
See application file for complete search history.

(56) References Cited

U.S. PATENT DOCUMENTS 5,978,731 A 11/1999 Matsuda
6,138,084 A * 10/2000 Mine ...................... G01C 21/26
702/158
(Continued)

FOREIGN PATENT DOCUMENTS

EP 2428770 3/2012
EP 3546890 10/2019
(Continued)

OTHER PUBLICATIONS

International Search Report and the Written Opinion Dated Dec. 23, 2021 From the International Searching Authority Re. Application No. PCT/IB2021/058837. (13 Pages).
(Continued)

*Primary Examiner* — Ramon A. Mercado
*Assistant Examiner* — David Ruben Pedersen

(57) ABSTRACT

A method for identifying at least one route that will limit the oscillations of a vehicle. The method includes providing a starting point and a destination point on a map stored in a database, identifying a plurality of possible routes between said starting point and said destination point, and determining at least one cost function associated with at least one route. The cost function depends on at least one of the number of bends, the distance between the bends, and the radii of curvature of the bends of said route. The method further includes displaying the routes on a user display in a graphic arrangement that depends on the previously determined cost functions.

29 Claims, 3 Drawing Sheets

(51) Int. Cl.
*G01C 21/00* (2006.01)
*G01C 21/36* (2006.01)

(52) U.S. Cl.
CPC ..... *G01C 21/3461* (2013.01); *G01C 21/3667* (2013.01); *G01C 21/3676* (2013.01); *G01C 21/3815* (2020.08)

(56) References Cited

U.S. PATENT DOCUMENTS

| | | | | |
|---|---|---|---|---|
| 6,681,177 | B2 * | 1/2004 | Joshi | G09B 29/003 701/25 |
| 8,306,732 | B2 * | 11/2012 | Hoffmann | G01C 21/3492 340/995.22 |
| 2007/0038367 | A1 | 2/2007 | Froeberg | |
| 2009/0300067 | A1 | 12/2009 | Denaro | |
| 2010/0324817 | A1 | 12/2010 | Hansen et al. | |
| 2011/0231086 | A1 | 9/2011 | Montealegre et al. | |
| 2013/0024107 | A1 | 1/2013 | Xie et al. | |
| 2016/0097649 | A1 * | 4/2016 | Broadbent | G01C 21/3667 701/428 |
| 2016/0167652 | A1 | 6/2016 | Slusar | |
| 2017/0010613 | A1 * | 1/2017 | Fukumoto | G08G 1/096844 |
| 2017/0356751 | A1 | 12/2017 | Iagnemma | |
| 2018/0052000 | A1 * | 2/2018 | Larner | G05D 1/0212 |
| 2019/0080266 | A1 | 3/2019 | Zhu et al. | |
| 2020/0200551 | A1 * | 6/2020 | Fischer | G01C 21/3626 |
| 2021/0381845 | A1 * | 12/2021 | Gokhale | G01C 21/3691 |

FOREIGN PATENT DOCUMENTS

| | | |
|---|---|---|
| JP | 2010-203975 | 9/2010 |
| JP | 2019-174339 | 10/2019 |
| JP | 2020-109414 | 7/2020 |
| WO | WO 2016/135561 | 9/2016 |
| WO | WO 2017/120129 | 7/2017 |

OTHER PUBLICATIONS

Wikipedia “Loss Function”, Wikipedia, XP055872173, 1 P., Oct. 27, 2019.

* cited by examiner

| Route | $\bar{r}_i$ (meters) | Zi normal | Ei normal | Ni normal | $\bar{d}_i$ (metri) | Oi normal | Ci |
|---|---|---|---|---|---|---|---|
| T1 | 6,5 | 1,000 | 0,403 | 0,800 | 12 | 0,583 | 0,676 |
| **T2** | **7,1** | **0,915** | **0,522** | **0,600** | **24** | **0,292** | **0,579** |
| T3 | 8,3 | 0,783 | 0,522 | 0,800 | 13 | 0,538 | 0,633 |
| T4 | 11,3 | 0,575 | 0,791 | 1,000 | 7 | 1,000 | 0,810 |
| T5 | 16,4 | 0,396 | 1,000 | 0,600 | 15 | 0,467 | 0,619 |

METHOD AND DEVICE FOR DETERMINING A ROUTE

RELATED APPLICATIONS

This application is a National Phase of PCT Patent Application No. PCT/IB2021/058837 having International filing date of Sep. 28, 2021, which claims the benefit of priority of Italy Patent Application No. 102020000023227 filed on Oct. 1, 2020. The contents of the above applications are all incorporated by reference as if fully set forth herein in their entirety.

FIELD AND BACKGROUND OF THE INVENTION

The present invention relates to a method and a device configured for determining and recommending an alternative route that can minimize kinetosis-related troubles suffered by the passengers of a vehicle, e.g. an autonomous vehicle.

Vehicles are known, in particular wheel-equipped vehicles such as motorcycles, cars and trucks, which comprise electronic devices adapted to determine and/or recommend and/or display routes stretching between a starting point and a destination point. Such devices may either be a part of the vehicle, i.e. pre-installed, or be sold separately, and are commonly referred to as satellite navigators or GPS navigators. The functions of such electronic devices are also provided by latest-generation smartphones or mobile phones.

The GPS navigators currently known in the art offer the possibility of setting a place of departure and/or a place of arrival, with the further possibility of entering intermediate stops along the route. After having computed the possible routes leading to the place of arrival from the place of departure, GPS navigators allow the user to select a preferred route among the available ones, e.g. the shortest route, the fastest route, etc.

GPS navigators also allow deciding whether, when calculating the possible routes, specific conditions, such as toll roads, ferries, etc., should be avoided or not.

It is known that between a given place of departure and a given place of arrival several routes or ways exist which can be followed by different vehicles, and which are recommended on the basis of the user's preferences and the vehicle type.

It is also known that a certain percentage of people are sensitive to kinetosis, commonly known as motion sickness, and that such people need to travel along routes that minimize the risk of feeling sick during the journey, irrespective of the fact that such routes may require a longer time of travel.

The need is therefore felt for providing a vehicle that comprises a satellite navigator or, in general, a GPS navigation system, which can help kinetosis-sensitive people select the best route that will minimize discomfort during the journey.

It is the object of the present invention to fulfil the above-mentioned needs in an optimized manner.

SUMMARY OF THE INVENTION

According to a first aspect, the present invention provides a method for identifying at least one route that will limit the oscillations of a vehicle.

In particular, said method comprises:

- providing a starting point and a destination point on a map stored in a database;
- identifying a plurality of possible routes between said starting point and said destination point;
- determining at least one cost function associated with at least one route;
  - wherein said cost function depends on at least one of the number of bends, the distance between the bends, and the radii of curvature of the bends of said route;
- displaying the routes on a user display in a graphic arrangement that depends on the previously determined cost functions.

Preferably, said cost function is directly proportional to either the inverse of the mean of the radii of curvature of the bends in said route or the inverse of the mean distance between successive bends of said route.

Preferably, said method further comprises associating with each route an indication about the time of travel, with respect to the route with the shortest time of travel.

Preferably, said method further comprises filtering out those routes which extend the time of travel beyond a predefined time threshold.

Preferably, said method further comprises identifying a plurality of routes, wherein each route comprises bends whose radius of curvature is greater than a threshold radius.

Preferably, said cost function depends on the product of the number of bends of said route and either the inverse of the mean distance between successive bends of said route or the inverse of the mean of the radii of curvature of the bends in said route.

Preferably, said cost function is calculated by approximating the bends of said route to circular arcs.

Preferably, said radii of curvature are calculated by using the length of the chords and sagittae of said circular arcs.

Preferably, said mean distance between successive bends is calculated as the mean of the distances between the midpoints of the circular arcs that approximate successive bends in said route.

Preferably, said displaying further comprises associating with each route a respective colour map that depends on the cost function associated with a respective route.

Preferably, said method further comprises:

- determining a plurality of partial cost functions associated with partial sections of said at least one route;
- displaying the individual sections by using colour maps that depend on the partial cost functions.

According to a second aspect, the present invention provides a GPS navigator. Said GPS navigator is suitable for identifying at least one route that will limit the oscillations of a vehicle.

Preferably, said GPS navigator comprises a display and a processor, wherein:

- said processor is configured for displaying, on said display, a plurality of possible routes between a starting point and a destination point, said processor being further configured for determining at least one cost function associated with at least one route, wherein each cost function depends on at least one of the number of bends, the distance between the bends, and the radii of curvature of the bends of said route,
- said processor is further configured for displaying the routes on said display in a graphic arrangement that depends on the previously determined cost functions.

Preferably, said GPS navigator is further configured for displaying the routes on said display by using colour maps that depend on the cost function associated with said routes.

Preferably, said GPS navigator is further configured for determining a plurality of partial cost functions associated with partial sections of said at least one route. Even more preferably, said GPS navigator is further configured for displaying the individual sections by using colour maps that depend on the partial cost functions.

Preferably, said GPS navigator is configured for issuing alert messages whenever said navigator detects the approaching of a route section. Even more preferably, said route section is associated with a high value of the partial cost function, compared with the values of the partial cost functions of other sections of the same route.

According to a further aspect, the present invention also provides a GPS system comprising the GPS navigator according to embodiments of the present invention and a remote server.

Preferably, the remote server comprises a processor and a database. Said processor of said server is configured for extracting said cost function from said database and sending it, over a wireless connection, to said processor of said GPS navigator, and wherein said GPS navigator comprises an accelerometer, said processor of said navigator being configured for sending the values measured by said accelerometer to the processor of said server, and said processor of said server being configured for aggregating the values received from said processor of said GPS navigator and for calibrating the cost function based on said values.

According to a further aspect, the present invention provides a vehicle comprising a navigator according to embodiments of the present invention.

Preferably, said vehicle is an autonomous vehicle.

These and other objects are achieved by means of a GPS navigator and a method for identifying a route as claimed in the appended claims.

BRIEF DESCRIPTION OF THE SEVERAL VIEWS OF THE DRAWINGS

For a better understanding of the present invention, some preferred embodiments thereof will be described below by way of non-limiting example with reference to the annexed drawings, wherein.

DESCRIPTION OF SPECIFIC EMBODIMENTS OF THE INVENTION

In general, the present invention provides a method suitable for identifying at least one route that, when travelled aboard a vehicle, will limit/reduce the oscillations affecting the vehicle.

In particular, the invention makes it possible to identify a route, given a starting point and a destination point, along which the vehicle will be subjected to fewer and/or smaller oscillations, compared with other routes connecting said starting point to said destination point.

The Applicant observes that by reducing the oscillations it is possible to lower the risk of kinetosis for the passengers of the vehicle.

Figure 1:
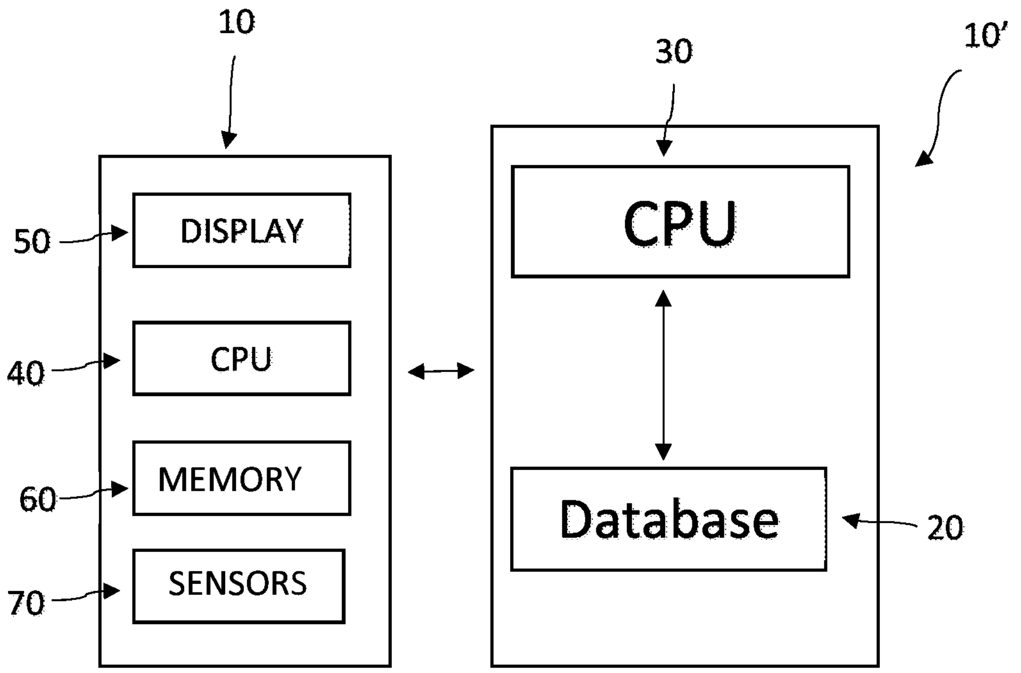
FIG. 1 schematically shows a GPS navigator according to the present invention.

For example, FIG. 1 schematically shows a satellite navigator or GPS navigator 10 configured for receiving, preferably through a graphic interface, information about the starting point P and the destination point D according to the prior art. The navigator 10 is also configured for receiving and storing one or more selection preferences as to the calculated and recommended routes. According to the present invention, for example, the navigator is configured for indicating, and storing into a physical memory 20 of the navigator 10, that the passengers aboard the vehicle include a person affected by kinetosis, or, more in general, the GPS navigator 10 is configured for receiving as input an indication regarding the route selection that gives priority to routes having the least probability of causing feelings of discomfort to the occupants of the vehicle due to kinetosis. Such feelings are typically a direct consequence of the vibrations and movements generated by the chosen route. It is known, in fact, that a person suffering from kinetosis is subject to neurological disorders due to the rhythmic or irregular movements of the body when in motion, e.g. when travelling in a vehicle (car, motorcycle, bus, etc.). Such movements create discomfort when they are rhythmic and irregular, e.g. when the vehicle is travelling along routes with many tight bends. Motion sickness in a car usually arises when travelling on suburban or mountain roads. Moreover, it appears that feelings of discomfort can be generated more frequently by autonomous vehicles, since in such vehicles the user may be distracted reading a book or watching a movie.

According to the present invention, the GPS navigator 10 is installed inside a vehicle, e.g. an autonomous vehicle; the GPS navigator 10 comprises an LCD display 50 for displaying a digital map and related information. In general, said display has touch-screen functionality to allow the user to interact with the system via a graphic interface, through which it is possible to enter the starting point and/or the destination point. In many cases, the GPS navigator 10 includes a loudspeaker, not shown in the drawing, through which voice indications about the available route and/or alert messages are provided.

Several types of GPS navigators exist which can be adapted to the present invention, the most common ones are navigators that include a database or a memory and a processor. The database or the memory perform the function of storing a digital geographic map of variable size, while the processor is typically configured for interacting with both the database and the management software of the GPS navigator. Such navigators (also referred to as stand-alone navigators) do not require a wireless connection to determine the routes between the starting and destination points, because all the main functions of the GPS navigator are executed locally.

Other types of GPS navigators, which are mostly intended for smartphones and mobile devices, but which can nevertheless be adapted to the present invention, include, just like those previously described, a memory and a processor. The digital maps are entirely stored in a remote server 10' comprising at least one database, a memory, and a further processor; typically, the processor of the server 10' performs the function of calculating the route between two points and supplying maps and/or instructions to the processor of the mobile device. Smartphones and mobile devices need a wireless connection to be able to operate as a GPS navigator. Some of these smartphones or mobile devices can download maps locally and operate like a navigator of the first type as described above (i.e. as a stand-alone navigator) even in the absence of a wireless connection.

The GPS navigator 10 of the present invention has access to a database 20, which may be either local (as is the case for stand-alone GPS navigators), i.e. stored in a local memory 60, or remote, i.e. stored in the memory of a server 10' (as is the case for mobile devices and smartphones). Said database 20 stores the information of the digital cartographic maps. As aforesaid, the GPS navigator 10 has a local memory 60 that stores the software for the execution of the programs of the navigator. The information contained in the database 20 may preferably be stored in or downloaded to the local memory 60. The GPS navigator 10 is also equipped with a digital processor or CPU (Central Processing Unit) 40 configured for processing the information contained in the digital maps (whether local or remote) and for executing the management software program of the GPS navigator 10. The GPS navigator 10 is also equipped with sensors 70, such as gyroscopes, magnetometers and/or accelerometers on 3 axes to determine accelerations, decelerations and directions when the navigator is in motion. The CPU 40 is in communication with the display 50, the memory 60 and the sensors 70. Through the processor CPU 40, The GPS navigator 10 can communicate with a further CPU 30 of the remote server 10' over a wireless connection, thus obtaining information about the routes or the digital map; preferably, the functions of the CPU 30 may be carried out by the CPU 40, depending of the type of navigator (whether a stand-alone navigator or a mobile device).

The CPU 30 of the server 10', or the CPU 40 of the GPS navigator 10, can receive and process a starting address P and a destination address D; they can also determine, between said points P and D, a plurality n of routes $T_i$ (i=1, 2 . . . n). Both points P and D are associated or associable, in the GPS navigator 10, with GPS coordinates known in the art. Said routes $T_i$ will have different characteristics in terms of time of travel, length, route type, number of bends, etc.

Figure 2:
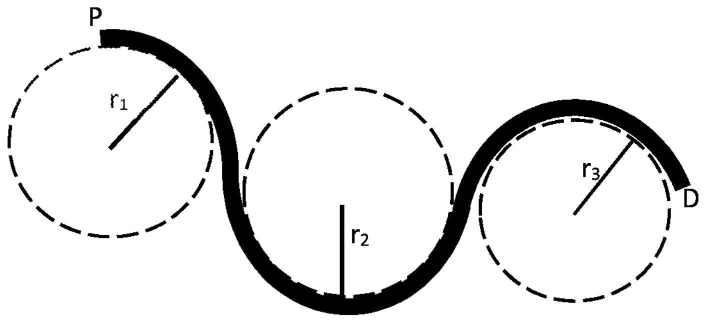
FIG. 2 shows the fundamental parameters for approximating the bends with osculating circles.

In the present invention, the digital map stored in the database 20 or in the local memory 60 associates with a plurality of routes $T_i$, or with a plurality of sections of a single route $T_i$, a plurality of cost functions $C_i$, which are determined as follows. The CPU 30 (or the CPU 40) in communication with the GPS navigator 10 of the present invention is configured for identifying the bends (turns, hairpin bends, etc.) that are present in each individual route $T_i$. In general, each bend of a route can be approximated, for example, to a part of a circular arc having a certain radius, commonly referred to as radius of curvature. More specifically, the radius of curvature of a bend is defined as the radius of that circle, commonly referred to as "osculating circle", which best approximates, locally and at a number of points, part of the bend (FIG. 2 shows three osculating circles). The CPU 30 (or the CPU 40) is configured for identifying a plurality of sections that are similar to circular arcs (i.e. the arcs of the osculating circles), the identification of the sections that are similar to circular arcs being executed for the n routes $T_i$. For example, the CPU 30 (or the CPU 40) is configured for identifying the circular arcs by analyzing the relationship between the latitude and longitude coordinates of the route. If the CPU 30 (or the CPU 40) detects that along the route $T_i$ the latitude and longitude coordinates (possibly transformed into UTM coordinates) have a mathematical relationship that can be approximated to a circular arc, then the CPU 30 will identify that portion of the route as a bend. Of course, the identification of all bends is executed for all the n routes $T_i$. Since those bends which have long radii of curvature will likely have a minimal impact on kinetosis, the CPU 30 (or the CPU 40) is preferably configured for filtering the identified bends; for example, a threshold may be set for the radius of curvature, so that, if the radius of curvature identified for a bend exceeds the threshold, then that bend will not be taken into account. In greater detail, the CPU 30 (or the CPU 40) is configured for considering only those bends whose radius of curvature is below a given threshold.

Once the bends of the n routes $T_i$ have been identified, the CPU 30 (or the CPU 40) first executes a calculation 20 analysis in order to calculate a cost function $C_i$ for each route $T_i$, and then associates the calculated cost function $C_i$ with the respective route $T_i$. n cost functions are thus calculated.

The cost function $C_i$ according to the present invention depends on at least one of the following four parameters, or a combination thereof: $Z_i$ "bend type", $E_i$ "number of bends", $N_i$ "bend density", $O_i$ "distance between the bends", the method of calculation of which are detailed below.

Figure 3:
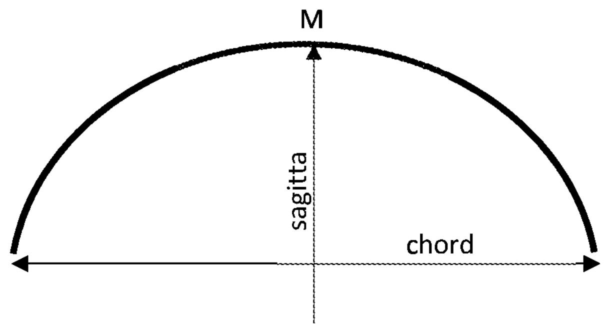
FIG. 3 graphically shows the parameters for calculating the radius of curvature.

In a first embodiment, the cost function $C_i$ is dependent on the parameter $Z_i$, which is a function of the type of each individual bend along the route $T_i$. The type of each bend is in turn dependent on the curvature of said bend and on the circular arc that approximates said bend. The CPU 30 (or the CPU 40) calculates the radii of curvature $$r_m^i, \text{ where } r_m^i$$

indicates the m-th radius of the i-th route $T_i$ and where m=1, 2 . . . $E_i$, and $E_i$ is the number of bends in the i-th route $T_i$, of course with i=1, 2 . . . n. The radius of curvature of the m-th bend of the i-th route $T_i$ is calculated as $$r_m^i = \frac{(c_m^i)^2}{8 \cdot f_m^i} + \frac{f_m^i}{2}$$

where $$c_m^i$$

is the length of the chord of the m-th bend of the i-th route $T_i$ and $$f_m^i$$

is the length of the sagitta of the m-th bend of the same route $T_i$. The chord $$c_m^i$$

of the bend is that segment which joins the two outermost points of the circular arc that approximates the bend, and the sagitta $$f_m^i$$

is the distance between the midpoint of the arc and the midpoint of the subtended chord (FIG. 3). The chord and the sagitta are also dependent on the direction of travel along the bend, because the circular arc that approximates the bend will be different depending on the direction of travel. In fact, the inner part of a bend has a shorter radius of curvature than the outer part of the bend, and therefore the direction of travel of the vehicle through the bend will have an impact on the calculated radii of curvature.

The parameter "bend type" $Z_i$ is made proportional to the inverse of the arithmetic mean $\bar{r}_i$ of the radii of curvature calculated for the route $T_i$, and said parameter $Z_i$ is also dependent on the variance var_$r_i$ of said radii. It is apparent that, if the mean $\bar{r}_i$ is small, then it means that the route $T_i$ is characterized by tight bends, whereas the variance var_$r_i$ indicates the variability of the radii of curvature n with respect to the mean $\bar{r}_i$ along the route $T_i$.

In the first embodiment, therefore, the cost function is proportional to the inverse of the mean of the radii of curvature $\bar{r}_i$. In other words, the cost function grows when the value of the mean of the radii of curvature decreases. Clearly, the navigator should recommend to the user that route which has the lowest cost function (i.e. the route with the highest mean of the radii of curvature) and, for the same mean of the radii of curvature, should suggest the one with the lowest variance.

In a second embodiment of the invention, the function $C_i$ depends, in addition or as an alternative, on the number of bends $E_i$ along the route $T_i$. Therefore, in the second embodiment the cost function is calculated as the number of bends $E_i$ in the i-th route $T_i$. In other words, the cost function grows as the number of bends $E_i$ in the i-th route $T_i$ increases. Clearly, the navigator should recommend to the user that route which has the lowest cost function, i.e. the route with fewest bends.

In a third embodiment of the present invention, the cost function $C_i$ depends, in addition or as an alternative, on the density $N_i$ of bends in the route $T_i$. The density $N_i$ is calculated as the number of bends $E_i$ divided by the total length between the first bend $$r_1^i$$

and the last bend $$r_{E_i}^i$$

of the route Ti. Preferably, the route sections from the starting point P to the first bend $$r_1^i$$

and from the last bend $$r_{E_i}^i$$

to the destination point D are not taken into account in the calculation of said total length between the first and last bends. In other words, the cost function grows as the density $N_i$ of bends in the route $T_i$ increases. Therefore, in the third embodiment the navigator should clearly recommend to the user that route which has the lowest bend density, i.e. the route with fewest bends per meter or kilometer.

Figure 4:
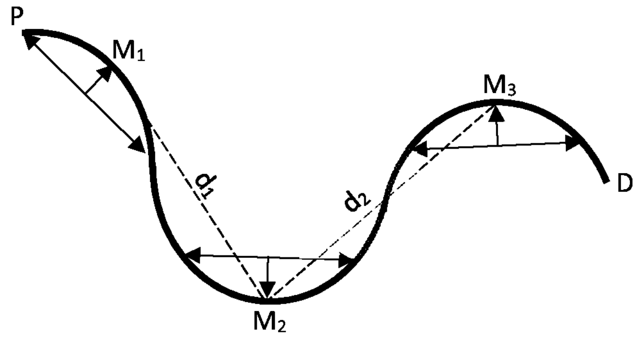
FIG. 4 graphically shows the parameters for calculating the distance between the bends.

In a fourth embodiment, the cost function depends, in addition or as an alternative, on the closeness of successive bends, which in turn depends on the distance between the bends represented by the parameter $O_i$. The parameter $O_i$ is calculated as the inverse of the mean of the distances between the bends, as will be explained below. It is clear that a person will likely feel sick if the bends follow each other closely; in other words, the cost function grows for routes having close successive bends. Therefore, for each route $T_i$ a value is calculated, which is the mean of the distances between the bends, as the distance in meters in a straight line between the midpoint of a circular arc and the midpoint of the immediately following circular arc (FIG. 3 and FIG. 4). More in detail, the midpoint $M_1$ (FIG. 4) of the first bend is identified, defined as the point of intersection of the sagitta with the circular arc of the bend, then the midpoint $M_2$ of the next bend is identified in the same manner, and the first distance $d_1$ is calculated in a straight line between the two midpoints $M_1$ and $M_2$; the procedure goes on with the calculation of the second distance $d_2$ a straight line between the midpoint $M_2$ of the second bend and the midpoint $M_3$ of the third bend following the second bend, until the last bend is taken into account, thus calculating $E_i-1$ distances $$d_m^i$$

between the bends, where $E_i$ is the number of bends and $$d_m^i$$

(m=1, 2 . . . $E_i-1$) are the distances between the bends of the i-th route $T_i$. The arithmetic mean $\bar{d}_i$ and its variance are then calculated. The parameter $O_i$ is calculated as the inverse of the arithmetic mean $\bar{d}_i$. It is clear that the smaller the mean $\bar{d}_i$, the greater the parameter $O_i$, and this indicates that the bends of the route $T_i$ are close to each other. Together with the information about the total number of bends $E_i$, this information gives an indication about the number of successive bends and how closely they follow each other on average. Alternatively, the distance between two successive bends can be calculated as the distance between the midpoint of the chord of one bend and the midpoint of the chord of the next bend. The parameter $O_i$ may also depend on the direction of travel and on the distance between the respective midpoints of the inner and outer parts of the bends.

Preferably, for each route $T_i$ the values of the cost function $C_i$ are calculated, and the latter are normalized with respect to the maximum value, so that the final cost function is $\tilde{C}_i=C_i/C_{max}$, where $C_{max}$ is the maximum value of the cost functions associated with the routes $T_i$. $\tilde{C}_i$ is clearly a value comprised between 0 and 1.

The calculation of the cost function can be combined using the function $$C_i = a \cdot Z_i + b \cdot E_i + c \cdot N_i + d \cdot O_i$$

where a, b, c, d are weights having predetermined values, which are used to attribute a heavier weight to one of the above-described four parameters.

The parameters $Z_i$, $E_i$, $N_i$ and $O_i$ are the parameters calculated for the i-th route $T_i$, and preferably each one of them can be normalized with respect to the maximum value of the respective parameter; therefore, in order to execute such normalization, $Z_i$ is divided by the maximum value $Z_{max}$ determined among all the values $Z_i$, and the same operation is executed in order to normalize the other parameters $E_i$, $N_i$e $O_i$.

The sum of the weights a+b+c+d=1. The weights a, b, c, d may also be configured for emphasizing one of the four parameters, e.g. if a=b=c=0 and d=1, the cost function will exclusively depend on the "distance between the bends" parameter $O_i$. The same consideration also applies when a single parameter among $Z_i$, $E_i$ and $N_i$ is to be emphasized.

For example, if a=b=0, c=d=0.5, then the cost function will be $C_i=0.5\cdot E_i+0.5\cdot O_i$, i.e. the cost function will likewise depend on the number of bends and on the distance between the bends. Different values of c and d may be chosen to give more importance to either the total number of bends or the distance between them.

In another example, if a=0.1, b=0.9, c=d=0, then the cost function will be $$C_i = 0.1 \cdot Z_i + 0.9 \cdot N_i$$

In this case, the cost function will attribute a lighter weight to the inverse of the mean of the radii of curvature than to the bend density. Different values of a and b may be chosen to give more importance to either the mean of the radii or the bend density. Preferably the cost function depends on the number of bends along the route and on at least one of the mean of the radii of curvature and the mean distance between the bends of the same route. Other formulae for calculating the cost function may also be used in the present invention, e.g. the cost function may be equal to the product of the total number of bends and the inverse of the mean of the radii of curvature in a given route, $$C_i = Z_i \cdot E_i$$

or the product of the total number of bends and the inverse of the mean distance between the bends, $$C_i = O_i \cdot E_i$$

or a weighted sum of the two products. Preferably, in the above-described examples the cost function and/or the parameters $Z_i$, $E_i$, $N_i$ and $O_i$ may also not be normalized.

Figures 5, 6:
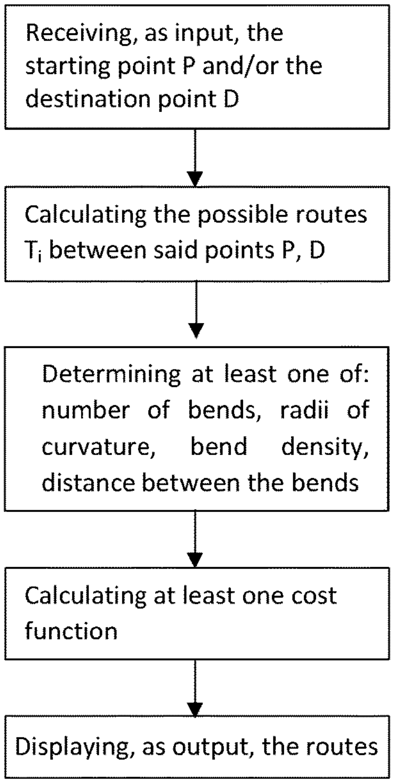
FIG. 5 shows an example of calculation of the cost function according to the present invention.
FIG. 6 illustrates the calculation method according to the present invention.

FIG. 5 shows, for clarity, an example of calculation of the cost function for 5 possible routes, $T_1$, $T_2$, $T_3$, $T_4$ e $T_5$, using the function $$C_i = a \cdot Z_i + b \cdot E_i + c \cdot N_i + d \cdot O_i$$

It has been assumed herein that T1 contains 27 bends with a density of 16 bends per km, T2 contains 35 bends with a density of 12 bends per km, T3 contains 35 bends with a density of 16 bends per km, T4 contains 53 bends with a density of 20 bends per km, and T5 contains 67 bends with a density of 12 bends per km.

The parameters $Z_i$, $E_i$, $N_i$ and $O_i$ have been normalized with respect to the respective maximum values, and the weights have been set as follows: a=0.3, b=0.3, c=0.1 and d=0.3. From FIG. 5 it can be inferred that the route with the lowest cost function is $T_2$, and hence $T_2$ is the route that should be given priority and displayed at the top of the list of possible routes, followed by $T_5$, $T_3$, $T_1$ and $T_4$.

The weights a, b, c, d or the type of cost function can be calibrated dynamically based on feedbacks received from the users after travelling the chosen routes. For example, the processor 30 of the remote server 10' is configured for receiving feedbacks, aggregate them and, based on such feedbacks, calibrating the weights in order to give more emphasis to one or more parameters of the cost function or to a specific type of cost function. Furthermore, if the vehicles or the GPS devices are, as is preferable, equipped with sensors 70 such as, gyroscopes and accelerometers on 3 axes (as is typically the case for smartphones), which are useful for calculating accelerations or decelerations occurring when driving through the bends, such values can be transmitted, preferably together with the GPS coordinates where such values are measured, by the processor 40 over a wireless network and received by the processor 30, aggregated, processed and then used for calibrating the weights or parameters of the cost function, according to a closed-loop control scheme.

As aforesaid, the calculated cost functions $C_i$ are associated with the routes $T_i$ and may preferably be stored into the digital map contained in the database 20 or in the memory 60. In this way, the database 20 or the memory 60 are configured for storing a digital map containing one or more cost functions associated with the routes $T_i$. Thus, the cost functions need not be calculated every time, but may be calculated only once and then determined (and extracted) by the processors CPU 30 or CPU 40 directly from the digital map contained in the database 20 or the memory 60.

The CPU 40 of the GPS navigator 10 is configured for determining a cost function $C_i$ for each possible route $T_i$, wherein "determining" means, in this case, either receiving over a wireless connection, from the processor CPU 30 and via the processor CPU 40, the cost functions stored in the remote database 20, or directly extracting them, by means of the processor CPU 40, from the digital map stored in the memory 60. With such cost function $C_i$, the navigator is configured for displaying the possible routes in a list sorted in ascending order of the cost function $C_i$. Therefore, the driver can select the route having the lowest cost function, which is equivalent to selecting the route that will have the least probability of causing motion sickness.

It is known that GPS navigators usually recommend the route with the shortest time of travel; therefore, the GPS navigator 10 of the present invention preferably assigns to each suggested route sorted according to the cost function an indication about its longer time of travel in comparison with the route with the shortest time of travel. Preferably, the GPS navigator should not take into account, and hence should not recommend, any route extending the time of travel (compared with the fastest route) beyond a given threshold.

In another example, the processor 40 is configured for providing information about the cost function $C_i$ in a graphic format, e.g. using a colour map to differentiate a route $T_i$ from another one $T_j$, where i≠j, based on the value of the cost function $\tilde{C}_i$.

In another variation of the invention, the cost function may be calculated not only for different routes $T_i$, but also for different sections $$t_k^i,$$

where k=1, 2 . . . K and K are the partial sections of the route $T_i$. This means that, if a generic route $T_i$ is, for example, 5 km long, the route may be divided, for example, into sections of 500 or 400 or 300 meters each. For each one of such K sections, the partial cost functions $$C_k^i$$

are calculated and associated, where k=1, 2 . . . M, in accordance with one of the above-described examples. Thus, the navigator can give an indication about the possibility of motion sickness along that route $T_i$ by using the colour map associated with the partial cost functions calculated along said route $T_i$. For example, it may indicate with different shades of the same colour or with different colours those sections where that given route has higher cost functions, i.e. where it is more likely to cause discomfort. This will allow the people in the vehicle to receive, for single sections of a route $T_i$, an indication about the risk of motion sickness, both graphically and through audible alert signals, so that they may decide to make a stop before driving along a section with many bends.

It is clear that the cost functions may be calculated whenever the user selects a destination to be reached, or may be pre-calculated and stored in the digital map (stored in the database 20 or in the memory 60) and then presented graphically to the user via the processor CPU 30 or CPU 40 when the user selects a destination to be reached.

It is also clear that the database 20 or the CPU 30 may either reside locally in the GPS navigator 10 or, as an alternative, reside in a remote computer in communication with the processor CPU 40 connected to the display 50 of the GPS navigator 10. In this latter case, the GPS navigator 10 and its CPU 40 will operate as a client and will only be configured for receiving the information about the destination and the configurations of the navigator, since the server 10' will be the one configured for calculating or determining the possible routes $T_i$ and for transmitting, via the CPU 30, the cost functions or the partial cost functions associated with said routes $T_i$. The GPS navigator 10 and the processor CPU 40 may also be configured for instructing an autonomous vehicle, in which the GPS navigator 10 resides, to take the route having the lowest cost function.

The GPS navigator 10, with its processor CPU 40, may be further configured for allowing the user to turn off the cost function-dependent visualization of the routes, if the processor 40 detects that the possible routes $T_i$ between the starting point P and the destination point D are located within an urban environment.

The method that can be implemented by the GPS navigator is the following (FIG. 6):

- receiving as input the starting point P and/or the destination point D;
- calculating the possible routes $T_i$ between said points P, D;
- for each calculated route $T_i$:
  - a) determining at least one of: number of bends, radii of curvature, bend density, distance between the bends,
  - b) calculating the cost function on the basis of at least one of: number of bends, mean of the radii of curvature, bend density, and mean distance between the bends,
  - c) calculating the cost function for each individual route $T_i$;
  - d) displaying, as output, the routes in a graphic arrangement dependent on the cost function or, as an alternative, displaying the routes in a graphic format by using a color map dependent on the cost function.

Lastly, it is apparent that the GPS navigator 10 and the method according to the present invention may be subject to modifications and variations, without however departing from the protection scope defined by the claims.

For example, the bends or the radii of curvature may be identified with equivalent results by using alternative methods or formulae, e.g. by using clothoids instead of, or in addition to, osculating circles. The distance between the bends may be calculated by using the distance between the midpoints of the chords of the bends. The cost function may depend on a function other than, but similar to, the arithmetic mean of the radii of curvature.

It should be noted that the above-described method can also be executed by means of a computing device lacking a GPS device; for example, such computing device may be a personal computer or a laptop. In particular, such computing device may require entering the starting point P and a destination point D on a map stored in a database.

After receiving the starting point P and the destination point, such computer identifies a plurality of possible routes Ti (between said starting point P and said destination point D) on said map and determines at least one cost function Ci associated with at least one route Ti, as described above. At least one route Ti is then displayed on a user display of the computing device. Preferably, the at least one route Ti is displayed in a graphic arrangement that is dependent on the previously determined cost functions Ci.

Preferably, such computing device can send at least one route of the plurality of routes Ti to a GPS navigator or to a device equipped with a GPS navigator.

The invention claimed is:

1. A method for identifying at least one route that will limit the oscillations of a vehicle, said method comprising:

providing a starting point (P) and a destination point (D) on a map stored in a database;

identifying a plurality of possible routes between said starting point (P) and said destination point (D);

measuring a midpoint distance (Oi) between a midpoint of a first bend and a midpoint of an immediately successive bend along each of the plurality of possible routes;

determining, based on a cost function (Ci), at least one cost associated with each route in the plurality of possible routes;

wherein said cost function (Ci) depends at least on the midpoint distance between bends (Oi) and has higher values for routes having shorter distances between successive bends (Oi);

displaying the routes on a user display in a list sorted in ascending order of the determined costs, or a graphic arrangement which gives priority to routes having a lower cost, thereby prioritizing the selection of the route that will have the least probability of causing discomfort to the occupants due to kinetosis.

2. The method according to claim 1, wherein said cost function (Ci) is directly proportional to either the inverse of the mean of the radii of curvature ($\bar{r}_i$) of the bends in said route or the inverse of the mean distance between successive bends of said route.

3. The method according to claim 1, wherein said method comprises associating with each route an indication about a time of travel, with respect to the route with a shortest time of travel.

4. The method according to claim 1, wherein said method further comprises filtering out those routes which extend a time of travel beyond a predefined time threshold.

5. The method according to claim 2, wherein said method further comprises identifying routes in the plurality of routes, wherein each route comprises bends whose radius of curvature $$(r_m^i)$$

is greater than a threshold radius.

6. The method according to claim 5, wherein said cost function (Ci) depends on the product of the number of bends of said route and either the inverse of the mean distance (di) between successive bends of said route or the inverse of the mean ($\bar{r}i$) of the radii of curvature of the bends in said route.

7. The method according to claim 1, wherein said cost is calculated by approximating the bends of said route to circular arcs.

8. The method according to claim 7, wherein said radii of curvature $$(r_m^i)$$

are calculated by using the length of the chords $$(c_m^i)$$

and sagittae $$(f_m^i)$$

of said circular arcs.

9. The method according to claim 7, wherein said mean distance ($\bar{d}i$) between successive bends is calculated as the mean of the distances between the midpoints of the circular arcs that approximate successive bends in said route.

10. The method according to claim 1, wherein said displaying further comprises associating with each route a respective colour map that depends on the cost associated with a respective route.

11. The method according to claim 1, wherein said method further comprises:

determining a plurality of partial costs associated with partial sections $$(t_k^i)$$

of said at least one route;

displaying the individual sections $$(t_k^i)$$

by using colour maps that depend of the partial costs.

12. A GPS navigator (10) suitable for identifying at least one route that will limit the oscillations of a vehicle, comprising a display (50) and a processor (40), wherein:

said processor (40) is configured for displaying, on said display (50), a plurality of possible routes between a starting point (P) and a destination point (D), said processor (40) being further configured for measuring a midpoint distance (Oi) between a midpoint of a first bend and a midpoint of an immediately successive bend along each of the plurality of possible routes and determining, according to a cost function (Ci), at least one cost associated with at least one route, wherein each cost function (Ci) depends on at least the midpoint distance (Oi) between the bends and has higher values for routes having shorter distances between successive bends (Oi);

said processor (40) is further configured for displaying the routes on said display (50) in a list sorted in ascending order by the determined costs, or a graphic arrangement that depends on the previously determined costs;

wherein said list or graphic arrangement gives priority to routes having lower values of the cost function, thereby prioritizing the selection of routes that will have the least probability of causing discomfort to the occupants due to kinetosis.

13. GPS navigator (10) according to claim 12, wherein said cost function is directly proportional to the inverse of the mean distance between successive bends of said route.

14. GPS navigator (10) according to claim 12, wherein said cost function (Ci) depends on the product of the number of bends of said route and either the inverse of the mean distance ($\bar{d}i$) between successive bends of said route or the inverse of the mean ($\bar{r}i$) of the radii of curvature of the bends in said route.

15. GPS navigator (10) according to claim 12, wherein said cost function (Ci) depends only on those bends whose radius of curvature $$(r_m^i)$$

is greater than a threshold.

16. GPS navigator (10) according to claim 15, wherein said cost function (Ci) approximates the bends of said route to circular arcs.

17. GPS navigator (10) according to claim 16, wherein said radii of curvature $$(r_m^i)$$

are calculated by using the length of the chords $$(c_m^i)$$

and sagittae $(f_m^i)$ of said circular arcs.

18. GPS navigator (10) according to claim 17, wherein said mean distance ($\bar{d}i$) between successive bends is calculated as the mean of the distances between the midpoints of the circular arcs that approximate successive bends in said route.

19. GPS navigator (10) according to claim 12, further configured for displaying the routes on said display (50) by using colour maps that depend on the cost associated with said routes.

20. GPS navigator (10) according to claim 12, wherein said GPS navigator (10) is configured for determining a plurality of partial costs associated with partial sections $(t_k^i)$ of said at least one route, and said GPS navigator (10) is configured for displaying the individual sections $(t_k^i)$ by using colour maps that depend on the partial cost.

21. GPS navigator (10) according to claim 20, wherein said GPS navigator (10) is configured for issuing alert messages whenever said navigator (10) detects the approaching of a route section $(t_k^i)$, said route section $(t_k^i)$ being associated with a high value of the partial cost, compared with the values of the partial cost of other sections of the same route $(t_k^i)$.

22. A GPS system comprising a GPS navigator (10) and a remote server (10') comprising a processor (30) and a database (20), said processor (30) of said server (10') being configured for extracting said cost function (Ci) from said database (20) and sending it, over a wireless connection, to said processor (40) of said GPS navigator (10), and wherein said GPS navigator (10) comprises an accelerometer (70), said processor (40) of said navigator (10) being configured for sending the values measured by said accelerometer to the processor (30) of said server (10'), and said processor (30) of said server (10') being configured for aggregating the values received from said processor (40) of said GPS navigator (10) and for calibrating the cost function (Ci) based on said values; wherein said navigator comprises a display and a processor wherein:

said processor (40) is configured for displaying, on said display (50), a plurality of possible routes between a starting point (P) and a destination point (D), said processor (40) being further configured for measuring a midpoint distance (Oi) between a midpoint of a first bend and a midpoint of an immediately successive bend along each of the plurality of possible routes and determining, according to a cost function, at least one cost associated with at least one route, wherein each cost function depends on at least the midpoint distance (Oi) between the bends and has higher values for routes having shorter distances between successive bends (Oi);

said processor (40) is further configured for displaying the routes on said display (50) in a list sorted in ascending order by the determined costs, or a graphic arrangement that depends on the previously determined costs;

wherein said list or graphic arrangement gives priority to routes having lower values of the cost function, thereby prioritizing the selection of routes that will have the least probability of causing discomfort to the occupants due to kinetosis.

23. A vehicle comprising a navigator, said navigator comprising a display (50) and a processor (40), wherein:

said processor (40) is configured for displaying, on said display (50), a plurality of possible routes between a starting point (P) and a destination point (D), said processor (40) being further configured for measuring a midpoint distance (Oi) between a midpoint of a first bend and a midpoint of an immediately successive bend along each of the plurality of possible routes and determining, according to a cost function, at least one cost associated with at least one route, wherein each cost function depends on at least the midpoint distance (Oi) between the bends and has higher values for routes having shorter distances between successive bends (Oi);

said processor (40) is further configured for displaying the routes on said display (50) in a list sorted in ascending order by the determined cost, or a graphic arrangement that depends on the previously determined cost;

wherein said graphic arrangement gives priority to routes having lower values of the cost function, thereby prioritizing the selection of routes that will have the least probability of causing discomfort to the occupants due to kinetosis.

24. The vehicle according to claim 23, wherein said vehicle is an autonomous vehicle.

25. The method according to claim 1, wherein said cost function (Ci) further depends on at least one of a number of bends (Ei), a type of bends (Zi), and a density of the bends (Ni) of said route.

26. The GPS navigator (10) according to claim 12 wherein the cost function (Ci) further depends on at least one of a number of bends (Ei), a type of bends (Zi), and a density of the bends (Ni) of said route.

27. The method according to claim 1, wherein the method further comprises:

receiving user input indicating that at least one passenger is sensitive to kinetosis or motion sickness, and in response to receiving said user input, prioritizing for display those routes having lower cost function values, whereby the displayed routes are optimized to minimize discomfort for kinetosis-sensitive passengers.

28. The GPS navigator according to claim 12, wherein the processor is further configured to:

receive user input indicating passenger sensitivity to motion sickness, store said user input in memory, and prioritize routes having lower cost function values when said user input indicates passenger sensitivity to motion sickness.

29. The GPS system according to claim 22, wherein:

the processor of the navigator sends accelerometer measurements together with GPS coordinate locations where said measurements were taken to the remote server, the processor of the remote server aggregates accelerometer data received from a plurality of GPS navigators that have traveled along the same routes, and the processor of the remote server calibrates the cost function based on the aggregated accelerometer data to improve accuracy of future route recommendations.

* * * * *